(12) United States Patent
Mauder

(10) Patent No.: US 10,279,792 B2
(45) Date of Patent: May 7, 2019

(54) DEVICE AND METHOD FOR DRYING AIR, AS WELL AS A RAIL VEHICLE COMPRISING SUCH A DEVICE

(71) Applicant: SIEMENS MOBILITY GMBH, Munich (DE)

(72) Inventor: Mike Mauder, Dessau-Rosslau (DE)

(73) Assignee: Siemens Mobility GmbH, Munich (DE)

( * ) Notice: Subject to any disclaimer, the term of this patent is extended or adjusted under 35 U.S.C. 154(b) by 662 days.

(21) Appl. No.: 14/787,035

(22) PCT Filed: Apr. 16, 2014

(86) PCT No.: PCT/EP2014/057711
§ 371 (c)(1),
(2) Date: Oct. 26, 2015

(87) PCT Pub. No.: WO2014/173752
PCT Pub. Date: Oct. 30, 2014

(65) Prior Publication Data
US 2016/0068150 A1 Mar. 10, 2016

(30) Foreign Application Priority Data
Apr. 25, 2013 (DE) .......... 10 2013 207 566

(51) Int. Cl.
*B01D 53/02* (2006.01)
*B60T 17/00* (2006.01)
(Continued)

(52) U.S. Cl.
CPC .......... *B60T 17/004* (2013.01); *B01D 53/261* (2013.01); *B61C 17/00* (2013.01);
(Continued)

(58) Field of Classification Search
CPC .......... B01D 2259/4566; B01D 53/261; B60T 17/004; B61C 17/00; B61D 27/00; B61D 27/0018; F24F 3/1429
See application file for complete search history.

(56) References Cited

U.S. PATENT DOCUMENTS 6,042,197 A 3/2000 Zoerner et al.
2004/0219408 A1 11/2004 Hesse
(Continued)

FOREIGN PATENT DOCUMENTS

DE 19617829 A1 11/1997
DE 102004051435 B3 6/2006
(Continued)

*Primary Examiner* — Christopher P Jones
(74) *Attorney, Agent, or Firm* — Laurence Greenberg; Werner Stemer; Ralph Locher

(57) ABSTRACT

An arrangement for drying air, particularly for a compressed air installation of a rail vehicle, includes an air dryer that receives air that is to be dried, via an air dryer inlet. In order to optimize the arrangement with regard to external conditions prevailing in the region of a rail bound transportation route to be travelled, an air conditioning installation is provided that supplies air to an air conditioning installation outlet, the air dryer inlet being connected, by way of an air channel particularly designed as an air conduit, to the air conditioning installation outlet such that at least one portion of the air supplied from the air conditioning installation forms the air that is to be dried. The invention also relates to a rail vehicle that includes such an arrangement, and also to a method for drying air.

14 Claims, 2 Drawing Sheets

(51) Int. Cl.
    *B01D 53/26*     (2006.01)
    *B61D 27/00*     (2006.01)
    *B61C 17/00*     (2006.01)
    *F24F 3/14*     (2006.01)

(52) U.S. Cl.
    CPC ......... *B61D 27/00* (2013.01); *B61D 27/0018* (2013.01); *F24F 3/1429* (2013.01); *B01D 2259/4566* (2013.01)

(56) References Cited

U.S. PATENT DOCUMENTS

2012/0073669 A1*   3/2012   Diekmeyer ........ B60G 17/0523
                                                                               137/1
2015/0075381 A1*   3/2015   Urra ..................... B60T 17/004
                                                                               96/130

FOREIGN PATENT DOCUMENTS

DE       102008031747 A1     1/2010
WO         02056401 A2     7/2002

* cited by examiner

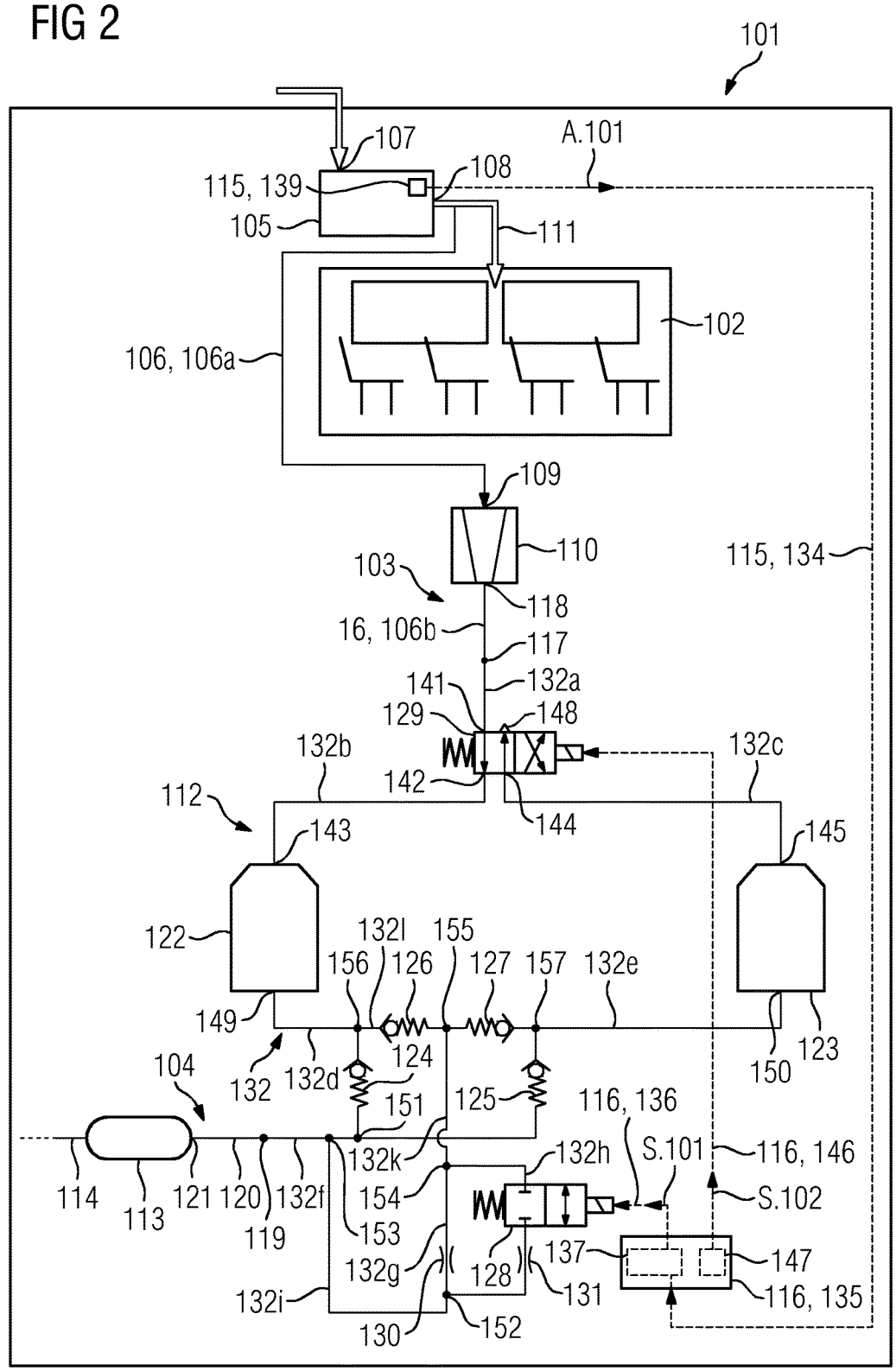

DEVICE AND METHOD FOR DRYING AIR, AS WELL AS A RAIL VEHICLE COMPRISING SUCH A DEVICE

BACKGROUND OF THE INVENTION

Field of the Invention

The invention relates to an arrangement for drying air, in particular for a compressed air installation of a rail vehicle, comprising an air dryer which is designed to be suitable for receiving air that is to be dried, via an air dryer inlet.

The invention furthermore relates to a rail vehicle comprising such an arrangement.

Furthermore, the invention relates to a method for drying air, in particular for use in a compressed air installation of a rail vehicle, in which an air dryer receives air that is to be dried, via an air dryer inlet.

Such an arrangement, such a rail vehicle and such a method are known from patent DE 196 17 829 C5. The air dryer described there has two drying chambers and an air conduit system, which is connected to the drying chambers, for conducting air dried by means of the drying chambers. Two regeneration conduit portions which are each provided with a regeneration nozzle are connected in parallel here. In order to be able to switch one of said regeneration conduit portions on and off as required, a switching means is arranged in series with the regeneration nozzle of said regeneration conduit portion, as a result of which this device is optimized in particular for the connection of two compressors.

BRIEF SUMMARY OF THE INVENTION

The invention is based on the object of providing an arrangement of the type mentioned at the beginning, a rail vehicle comprising such an arrangement and a method of the type mentioned at the beginning that are optimized with regard to external conditions prevailing in the region of a rail-bound transportation route to be traveled.

In order to achieve this object, the invention proposes an arrangement with the features as claimed and a rail vehicle comprising such an arrangement as claimed. According to the invention, an air conditioning installation which supplies air to an air conditioning installation outlet is provided, wherein the air dryer inlet is connected via an air channel, which is designed in particular as an air conduit, to the air conditioning installation outlet in such a manner that at least one portion of the air supplied by the air conditioning installation forms the air that is to be dried.

Furthermore, in order to achieve this object, the invention proposes a method as claimed, in which an air conditioning installation supplies air to an air conditioning installation outlet, wherein at least one portion of the air supplied by the air conditioning installation is supplied via an air channel, which connects the air dryer inlet to the air conditioning installation outlet and is designed in particular as an air conduit, as the air that is to be dried.

In the arrangement according to the invention, the rail vehicle according to the invention and the method according to the invention, the air that is to be dried is removed from the air conditioning installation in a particularly advantageous manner. The air supplied by the air conditioning installation is cooled while the air conditioning installation is in operation, in comparison to the air which is supplied to the air conditioning installation from the atmosphere. It is therefore ensured that the air which the air dryer receives via the air dryer inlet thereof in the form of the air that is to be dried has already previously been cooled by a condenser of the air conditioning installation. As a result, the air that is to be dried has a constantly low temperature and also already constantly low air humidity. Constant conditions are therefore provided making it possible to optimize the dimensioning of drying chambers and the cycle time thereof and therefore the portion of the regeneration air required for regenerating the drying chambers to said constant conditions. The efficiency and the dimensioning of the entire arrangement can therefore be optimized. Energy and costs can thereby be saved.

It is considered advantageous if an air compressor is arranged in the air channel.

Furthermore, it is considered advantageous if the air dryer has an air conduit system, which is connected to at least one drying chamber, for conducting air dried by means of the drying chamber, said air conduit system having at least two regeneration conduit portions which are connected in parallel and are each provided with a regeneration nozzle and in one of which a switching means for switching the one regeneration conduit portion on and off as required is arranged in series with the regeneration nozzle, and if a control device is designed to be suitable for controlling the switching means depending on the operating state of the air conditioning installation. This is because, with such a refinement, under extreme operating conditions a second regeneration nozzle connected in parallel can supply more regeneration air via the switching means—preferably in the form of a solenoid valve—in order, for example, to ensure a certain required quality of the dried air (compressed air quality) in a compressed air installation of a rail vehicle.

In addition, it is considered advantageous if a sensor device is designed to be suitable for detecting measured values corresponding to the operating state of the air conditioning installation and for outputting said measured values as an output signal via a first operative connection to the control device, and if the control device is designed to be suitable for outputting a control signal, which is dependent on the output signal, via a second operative connection to the switching means in order to control the switching means. The operating state of the air conditioning installation—i.e. the circumstance of whether the air conditioning installation is or is not in operation—can therefore be used in an advantageous manner as parameter for realizing the required quality.

It is also advantageous if the air conduit system is connected to a second drying chamber, wherein the two drying chambers are alternately switchable by means of a further switching means into a drying phase and a regeneration phase.

The control device preferably determines the control signal with reference to the output signal by means of a computer-based evaluation logic.

BRIEF DESCRIPTION OF THE SEVERAL VIEWS OF THE DRAWING

To further explain the invention,

FIG. 2 shows schematically a second exemplary embodiment of the rail vehicle according to the invention with a second embodiment of the arrangement according to the invention for drying air.

DESCRIPTION OF THE INVENTION

Figure 1:
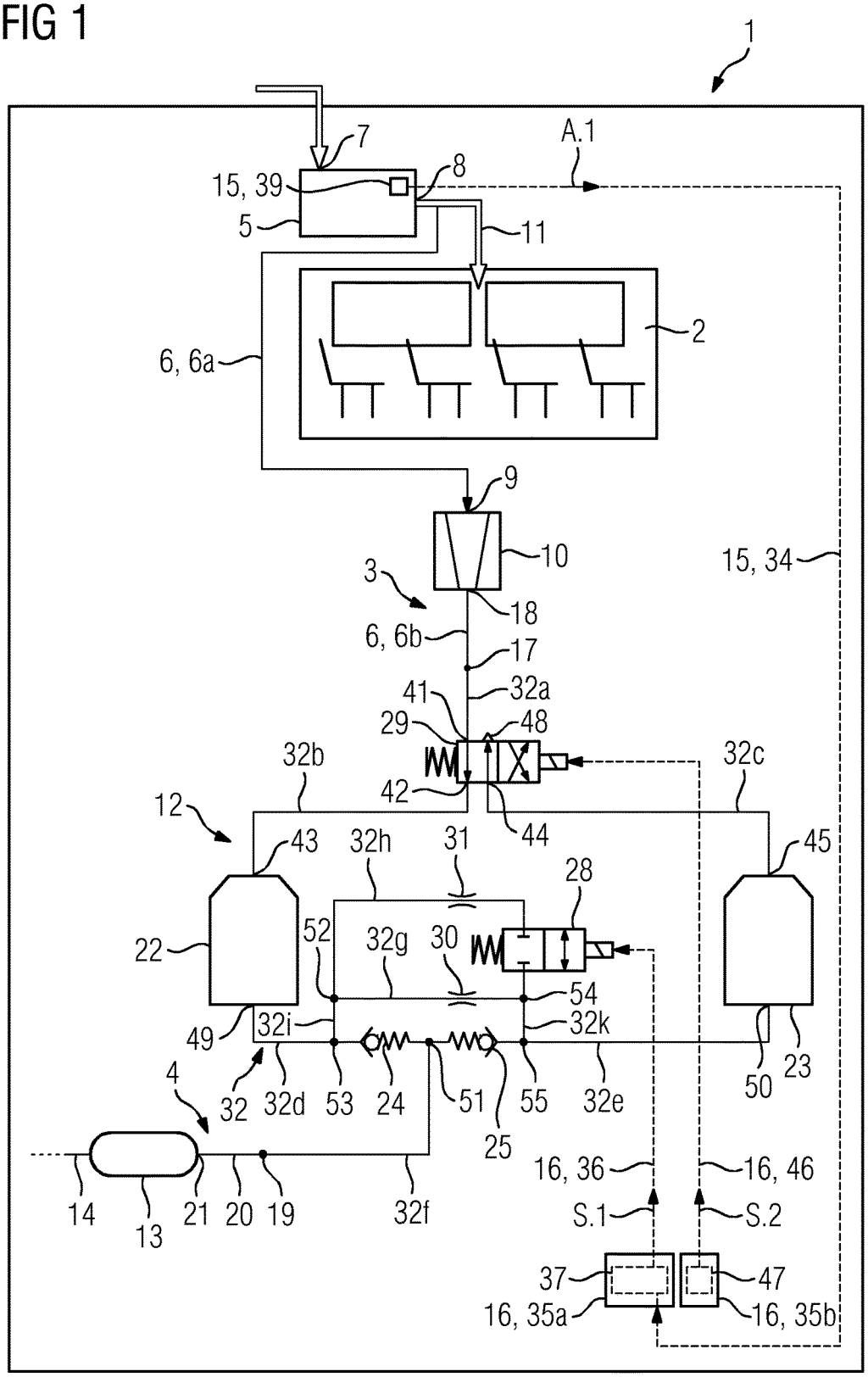
FIG. 1 shows schematically a first exemplary embodiment of a rail vehicle according to the invention with a first embodiment of an arrangement according to the invention for drying air.

FIGS. 1 and 2 show, in a schematic illustration, a rail vehicle 1; 101 with a passenger compartment 2; 102 and a first embodiment 3; 103 in each case of the arrangement according to the invention for drying air. The two embodiments 3; 103 of the arrangement according to the invention for drying air each comprise a compressed air installation, denoted as a whole by 4; 104, and an air conditioning installation 5; 105. By means of the air conditioning installation 5; 105, air that is to be dried is supplied to the compressed air installation 4; 104 via an air channel 6; 106. Air that is to be cooled is fed from the atmosphere to the air conditioning installation via an air conditioning installation inlet 7; 107. A portion of the air channel 6; 106 that is designed as an air conduit 6a; 106a connects an air conditioning installation outlet 8; 108 to a compressor inlet 9; 109 of a compressor 10; 110 of the compressed air installation in order to guide a portion of the air supplied by the air conditioning installation to the compressor inlet. Via a further air channel 11; 111 connected to the air conditioning installation outlet, a further portion of the air supplied by the air conditioning installation is guided into the passenger compartment 2; 102. The air supplied to the air conditioning installation outlet of the air conditioning installation is cooled while the air conditioning installation is in operation and is not cooled when the air conditioning installation is not in operation.

In the two embodiments 3; 103 of the arrangement according to the invention, of the compressed air installation 4; 104 there is shown, in each case in addition to the compressor 10; 110, in particular an air dryer, which is denoted as a whole by 12; 112, a main container 13; 113, which feeds a main air container conduit 14; 114, a sensor device, which is denoted as a whole by 15; 115, and a control device 16; 116.

An air dryer inlet 17; 117 of the air dryer 12; 112 is connected here via a further portion of the air channel 6; 106, which portion is designed as an air conduit 6b; 106b, to a compressor outlet 18; 118 of the compressor 10; 110. In addition, an air dryer outlet 19; 119 of the air dryer 12; 112 is connected via an air conduit 20; 120 to a main container inlet 21; 121 of the main container 13; 113.

In the two embodiments 3; 103 of the arrangement according to the invention, the air dryer 12; 112 in each case comprises two drying chambers 22, 23; 122, 123 filled in a customary manner with suitable granules. In addition, the air dryer 12; 112 comprises nonreturn valves 24, 25; 124, 125, 126, 127, two switching means 28, 29; 128, 129 in the form of solenoid valves and two regeneration nozzles 30, 31; 130, 131.

Furthermore, in the two embodiments 3; 103 of the arrangement according to the invention, the air dryer 12; 112 comprises an air conduit system, which is denoted as a whole by 32; 132 and serves, firstly, for introducing the air that is to be dried into the drying chambers 22, 23; 122, 123 and, secondly, for conducting air dried by means of the drying chambers. Said air conduit system 32; 132 comprises a plurality of conduit portions 32a, 32b, . . . , 32k; 132a, 132b, . . . , 132k, 132l. A portion of the dried air is used here for regenerating the drying chambers 22, 23; 122, 123. For this purpose, the two conduit portions denoted by 32g, 32h; 132g, 132h, which are each provided with one of the regeneration nozzles 30, 31; 130, 131 and are connected in parallel, form regeneration conduit portions. For switching the regeneration conduit portion which is denoted by 32h; 132h on and off as required, that one of the switching means which is denoted by 28; 128 is arranged in said regeneration conduit portion in series with the regeneration nozzle 31; 131.

The control device 16; 116 is designed to be suitable for controlling the one switching means 28; 128 depending on the operating state of the air conditioning installation 5; 105. For this purpose, the sensor device 15; 115 detects measured values corresponding to the operating state of the air conditioning installation and outputs said measured values as an output signal A.1; A.101 via a first operative connection 34; 134 to the controller 35a; 135 of the control device 16; 116. In order to control the one switching means 28; 128, the controller 35a; 135 of the control device 16; 116 then outputs a control signal S.1; S.101, which is dependent on the output signal A.1; A.101, via a second operative connection 36; 136 to the one switching means 28; 128. The controller 35a; 135 of the control device determines the control signal S.1; S.101 by means of a first computer-based evaluation logic 37; 137 with reference to the output signal A.1; A.101.

In order to determine the operating state of the air conditioning installation 5; 105, the sensor device 15; 115 has a sensor 39; 139 which outputs the measured values which it determines—the respective value of which indicates whether the air conditioning installation 5; 105 is or is not in operation—in the form of the output signal A.1; A.101.

The conduit portion which is denoted by 32a; 132a and one end of which forms the air dryer inlet 17; 117 is connected at the other end thereof to a first connection 41; 141 of the further switching means 29; 129. The conduit portion denoted by 32b; 132b is connected at one end to a second connection 42; 142 of the further switching means 29; 129 and at the other end thereof to a first connection 43; 143 of the one drying chamber 22; 122. The conduit portion denoted by 32c; 132c is connected at one end to a third connection 44; 144 of the further switching means 29; 129 and at the other end thereof to a first connection 45; 145 of the other drying chamber 23; 123.

A controller 35b or the controller 135 of the control device 16; 116 is designed to be suitable to output further control signals S.2; S.102 via a third operative connection 46; 146 to the further switching means, denoted by 29; 129 for controlling the further switching means 29; 129. By means of the further control signals S.2; S.102, the controller 35b; 135 of the control device 16; 116 controls the further switching means 29; 129 in such a manner that the two drying chambers 22, 23; 122, 123 are alternately switchable into a drying phase and a regeneration phase. The controller 35b; 135 of the control device 16; 116 determines the further control signals S.2; S.102 here by means of a further computer-based evaluation logic 47; 147, wherein the switching over can take place after a fixed time-controlled cycle or depending on the flow rate of the air that is to be dried—as is already known, for example, from document EP 0 199 948 B1. In the first embodiment 3 of the arrangement according to the invention, the computer-based evaluation logic 37 is part of the controller, denoted by 35a, of the control device 16, while the further computer-based evaluation logic 47 is part of the further controller, denoted by 35b, of the control device 16. In contrast thereto, in the case of the second embodiment of the arrangement according to the invention, the two computer-based evaluation logics 137, 147 are part of the controller 135 of the control device 116.

The compressor 10; 110 conveys compressed air into the conduit portion 32a; 132a which is alternately connectable to one of the two drying chambers 22, 23; 122, 123 via the second switching means 29; 129. According to FIGS. 1 and 2, the conduit portion 32a; 132a is just now connected to the drying chamber 22; 122. The drying chamber in each case not just now connected to the conduit portion—in FIGS. 1 and 2 that is the drying chamber 23; 123—is connected by the second switching means 29; 129 to a vent 48; 148 to the atmosphere. The drying chambers 22, 23; 122, 123 are provided with second connections 49, 50; 149, 150 opposite the first connections 43, 45; 143, 145 thereof. The conduit portion denoted by 32d; 132d is connected to the second connection 49; 149 of the one drying chamber 22; 122 and the conduit portion denoted by 32e; 132e is connected to the second connection 50; 150 of the other drying chamber 23; 123. The two conduit portions 32d, 32e; 132d, 132e lead into a branching point 51; 151, from which the conduit portion denoted by 32f; 132f branches. The nonreturn valve 24; 124, which opens in the direction of the branching point 51; 151, is arranged in the conduit portion 32d; 132d, and the nonreturn valve 25; 125, which opens in the direction of the branching point 51; 151, is arranged in the conduit portion 32e; 132e. That end of the conduit portion 32f; 132f which points in the direction of the main container 10; 110 forms the air dryer outlet 19; 119.

The two embodiments 3; 103 of the arrangement according to the invention differ in respect of the connection of the two regeneration conduit portions 32g, 32h; 132g, 132h which are connected in parallel and via which compressed air dried by means of the drying chamber which is active just now is conducted to the drying chamber which is not active just now in order to regenerate the latter.

In the embodiment 3, shown in FIG. 1, of the arrangement according to the invention, the dried compressed air for regenerating the drying chamber which is not active just now is taken directly from the drying chamber which is in each case active. For this purpose, one end of the regeneration conduit portions 32g, 32h which are connected in parallel is connected at a branching point 52 to the conduit portion which is denoted by 32i and branches off from the conduit portion 32d at a branching point 53. The other end of the regeneration conduit portions 32g, 32h which are connected in parallel is connected at a branching point 54 to the conduit portion which is denoted by 32k and branches off from the conduit portion 32e at a branching point 55.

In contrast to the first embodiment 3 shown in FIG. 1, in the case of the second embodiment 103, shown in FIG. 2, of the arrangement according to the invention, dried compressed air for regenerating the drying chamber which is not active just now is taken from the conduit portion 132f. For this purpose, one end of the regeneration conduit portions 132g, 132h which are connected in parallel is connected at a branching point 152 to the conduit portion which is denoted by 132i and branches off from the conduit portion 132f at a branching point 153. The other end of the regeneration conduit portions 132g, 132h which are connected in parallel is connected at a branching point 154 to the conduit portion which is denoted by 132k and branches off at a branching point 155 from the conduit portion denoted by 132l. The conduit portion 132l branches off here at one end from the conduit portion 132d at a branching point 156 and at the other end from the conduit portion 132e at a branching point 157. In the conduit portion 132l, the nonreturn valve 126, which opens in the direction of the branching point 156, is arranged between the two branching points 156 and 155, and the nonreturn valve 127, which opens in the direction of the branching point 157, is arranged between the two branching points 157 and 155.

The invention claimed is:

1. An arrangement for drying air, comprising:
an air dryer and an air dryer inlet configured for receiving air to be dried in said air dryer;
an air conditioning installation configured to supply air to an air conditioning installation outlet;
said air dryer inlet being connected via an air channel to said air conditioning installation outlet such that at least one portion of the air supplied by said air conditioning installation forms the air to be dried; and
an air compressor disposed in said air channel.

2. The arrangement according to claim 1, configured for a compressed air installation of a rail vehicle.

3. The arrangement according to claim 1, wherein said air channel is an air conduit.

4. The arrangement according to claim 1, wherein said air dryer has an air conduit system connected to at least one drying chamber, for conducting air dried by way of said drying chamber, said air conduit system having at least two regeneration conduit portions connected in parallel and each provided with a regeneration nozzle, and a switching device, for switching the one regeneration conduit portion on and off, connected in one of said regeneration conduit portions in series with at least one of said regeneration nozzles, and a control device is configured for controlling said switching device depending on an operating state of said air conditioning installation.

5. The arrangement according to claim 4, which comprises a sensor device disposed and configured for detecting measured values corresponding to the operating state of said air conditioning installation and for outputting the measured values as an output signal via a first operative connection to said control device, and wherein said control device is configured for outputting a control signal, which is dependent on the output signal, via a second operative connection to the switching device in order to control said switching device.

6. The arrangement according to claim 4, wherein said at least one drying chamber is one of a first and a second drying chamber and wherein said air conduit system is connected to said second drying chamber, wherein said first and second drying chambers are alternately switchable by way of a further switching device into a drying phase and a regeneration phase.

7. The arrangement according to claim 5, wherein said control device is configured to determine the control signal with reference to the output signal by way of a computer-based evaluation logic.

8. A rail vehicle, comprising an arrangement for drying air according to claim 1.

9. A method for drying air, the method comprising:
receiving in an air dryer air to be dried, via an air dryer inlet;
supplying air from an air conditioning installation to an air conditioning installation outlet;
supplying at least a portion of the air supplied by the air conditioning installation via an air channel, which connects the air dryer inlet to the air conditioning installation outlet, as the air that is to be dried;
compressing the air supplied by the air conditioning installation prior to entry into the air dryer by way of a compressor arranged in the air channel.

10. The method according to claim 9, which comprises implementing the method steps in a compressed air installation of a rail vehicle.

11. The method according to claim 9, which comprises designing the air channel, which connects the air dryer inlet to the air conditioning installation outlet, as an air conduit.

12. The method according to claim 9, wherein: an air conduit system of the air dryer is connected to at least one drying chamber and configured for conducting air dried by way of the drying chamber, the air conduit system having at least two regeneration conduit portions connected in parallel, each of the regeneration conduit portions being provided with a regeneration nozzle and one of the regeneration conduit portions having a switching means arranged in series with the respective regeneration nozzle; selectively switching the one regeneration conduit portion on and off by way of the switching means, as required, and controlling the switching means with a control device depending on an operating state of the air conditioning installation.

13. The method according to claim 12, which comprises:
- detecting, with a sensor device, measured values corresponding to the operating state of the air conditioning installation and outputting the measured values as an output signal via a first operative connection to the control device; and
- outputting, with the control device, a control signal, which is dependent on the output signal, via a second operative connection to the switching means to thereby control the switching means.

14. The method according to claim 12, which comprises connecting a second drying chamber to the air conduit system, and alternately switching the two drying chambers by way of a further switching means into a drying phase and a regeneration phase.

* * * * *